US010908870B2

(12) United States Patent
Chang et al.

(10) Patent No.: US 10,908,870 B2
(45) Date of Patent: Feb. 2, 2021

(54) AUDIO PLAYING METHOD, APPARATUS, DEVICE AND SERVER

(71) Applicant: BAIDU ONLINE NETWORK TECHNOLOGY (BEIJING) CO., LTD., Beijing (CN)

(72) Inventors: Xiantang Chang, Beijing (CN); Lifeng Zhao, Beijing (CN); Shiwei Yan, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 21 days.

(21) Appl. No.: 16/004,736

(22) Filed: Jun. 11, 2018

(65) Prior Publication Data
US 2019/0012134 A1 Jan. 10, 2019

(30) Foreign Application Priority Data

Jul. 5, 2017 (CN) .......................... 2017 1 0542305

(51) Int. Cl.
*G06F 3/16* (2006.01)
(52) U.S. Cl.
CPC .............. *G06F 3/165* (2013.01); *G06F 3/167* (2013.01)
(58) Field of Classification Search
CPC ................................. G06F 3/165; G06F 3/167
(Continued)

(56) References Cited

U.S. PATENT DOCUMENTS 6,014,693 A * 1/2000 Ito ...................... H04N 7/17336
348/E7.073
6,529,146 B1 * 3/2003 Kowalski ................ H03M 7/00
341/50

(Continued)

FOREIGN PATENT DOCUMENTS

CN 105898408 8/2016
CN 106878808 6/2017
(Continued)

OTHER PUBLICATIONS

JPO, Office Action for JP Application No. 2018113978, dated Jun. 25, 2019.

(Continued)

*Primary Examiner* — Hemant S Patel
(74) *Attorney, Agent, or Firm* — Hodgson Russ LLP

(57) ABSTRACT

The present disclosure provides an audio playing method and device. The method may include the following. When a loading speed of a present audio file containing target audio content is changed during the present audio file is played, a target definition for playing the target audio content is determined. It is determined whether to report an audio file acquisition request to a server based on a preset strategy. When it is determined to report the audio file acquisition request to the server, the audio file acquisition request is reported to the server. The audio file acquisition request may include the target definition and an identifier of a target audio file containing the target audio content. An audio playing instruction sent by the server is acquired. The audio playing instruction may include the target audio file corresponding to the identifier and the target definition. The target audio file is played.

14 Claims, 8 Drawing Sheets

(58) Field of Classification Search
USPC .............................. 700/94; 348/14.01–14.16
See application file for complete search history.

(56) References Cited

U.S. PATENT DOCUMENTS

| | | | |
|---|---|---|---|
| 7,069,014 B1* | 6/2006 | Thenthiruperai ........................... H04L 29/06027 | 370/352 |
| 7,536,469 B2* | 5/2009 | Chou ............... H04N 21/23406 | 709/231 |
| 8,868,772 B2* | 10/2014 | Major ............... H04N 21/25808 | 709/231 |
| 2002/0004841 A1* | 1/2002 | Sawatari ................ H04L 47/10 | 709/232 |
| 2002/0138619 A1* | 9/2002 | Ramaley ........... H04L 29/06027 | 709/226 |
| 2008/0120495 A1* | 5/2008 | Aharonson ............. G06F 9/451 | 712/226 |
| 2011/0047287 A1* | 2/2011 | Harrang ................. H04L 45/00 | 709/235 |
| 2012/0005364 A1* | 1/2012 | Ma ..................... G06Q 30/0241 | 709/231 |
| 2013/0085586 A1* | 4/2013 | Parekh ................. G11B 27/034 | 700/94 |
| 2013/0091297 A1* | 4/2013 | Minder ............ H04N 21/23439 | 709/231 |
| 2013/0310959 A1* | 11/2013 | Sandu ..................... G10L 25/60 | 700/94 |
| 2013/0326024 A1* | 12/2013 | Chen ................... H04L 65/4084 | 709/219 |
| 2014/0366070 A1* | 12/2014 | Lee ..................... H04N 21/2662 | 725/62 |
| 2016/0080237 A1* | 3/2016 | Halepovic ........... H04L 43/0894 | 709/224 |
| 2016/0316274 A1 | 10/2016 | Wang | |
| 2017/0237965 A1* | 8/2017 | Wang ............... H04N 21/85406 | 348/42 |
| 2017/0332282 A1* | 11/2017 | Dao ....................... H04L 1/0002 | |

FOREIGN PATENT DOCUMENTS

| | | |
|---|---|---|
| JP | 2004516717 | 6/2004 |
| JP | 2005202052 | 7/2005 |
| JP | 2012248936 | 12/2012 |

OTHER PUBLICATIONS

SIPO, First Office Action for CN Application No. 201710542305.9, dated Mar. 19, 2020.

* cited by examiner

AUDIO PLAYING METHOD, APPARATUS, DEVICE AND SERVER

CROSS-REFERENCE TO RELATED APPLICATION

This application is based upon and claims a priority to Chinese Patent Application Serial No. 201710542305.9, filed on Jul. 5, 2017, the entire content of which are incorporated herein by reference.

FIELD

The present disclosure relates to the field of audio technologies, and more particularly to an audio playing method, an audio playing apparatus, an audio playing device and a server.

BACKGROUND

At present, an audio playing device such as a smart speaker is a popular smart device, which may play audio for a user by connecting to a Wi-Fi (Wireless Fidelity) network.

In the related art, when the audio playing device plays music, if the network condition is bad or the network is unstable, audio data may be buffered and music stuttering further occurs. If the music stuttering pauses for a long time period, the audio playing device may broadcast to the user a voice message that the present network condition is not good or ask the user to check the network. Therefore, the user may perform corresponding operations based on the prompt message. However, by the above manner, the user is prompted when the music is stuck, which results in the user frequently being prompted when the number of music stuttering is large, thus the user may be disturbed and the audio playing device has poor use effect.

SUMMARY

Embodiments of a first aspect of the present disclosure provide an audio playing method. The method may be applicable to an audio playing device. The method may include the following. When a loading speed of a present audio file containing target audio content is changed during the present audio file is played, a target definition for playing the target audio content is determined. It is determined whether to report an audio file acquisition request to a server based on a preset strategy. When it is determined to report the audio file acquisition request to the server, the audio file acquisition request is reported to the server. The audio file acquisition request may include the target definition and an identifier of a target audio file containing the target audio content. An audio playing instruction sent by the server is acquired. The audio playing instruction may include the target audio file corresponding to the identifier and the target definition. The target audio file is played.

Embodiments of a second aspect of the present disclosure provide another audio playing method. The method may be applicable to a server. The method may include the following. An audio file acquisition request reported by an audio playing device is acquired. The audio file acquisition request may include a target definition and an identifier of a target audio file containing target audio content. An audio playing instruction is sent to the audio playing device. The audio playing instruction may include the target audio file corresponding to the identifier and the target definition.

Embodiments of a third aspect of the present disclosure provide an audio playing device. The device may include a memory, a processor and computer programs stored on the memory and executable by the processor. The processor is configured to execute the computer programs to implement the audio playing method according to the embodiments of the first aspect of the present disclosure.

Embodiments of a fourth aspect of the present disclosure provide a server. The server may include a memory, a processor and computer programs stored on the memory and executable by the processor. The processor is configured to execute the computer programs to implement the audio playing method according to the embodiments of the second aspect of the present disclosure.

Embodiments of a fifth aspect of the present disclosure provide a computer-readable storage medium having computer programs stored thereon. When the computer programs are executed by a processor, the processor is caused to perform the audio playing method according to the embodiments of the first aspect of the present disclosure.

Embodiments of a sixth aspect of the present disclosure provide another computer-readable storage medium having computer programs stored thereon. When the computer programs are executed by a processor, the processor is caused to perform the audio playing method according to the embodiments of the second aspect of the present disclosure.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

The above and/or additional aspects and advantages of embodiments of the present disclosure will become apparent and more readily appreciated from the following descriptions made with reference to the drawings, in which.

DETAILED DESCRIPTION

Figure 1:
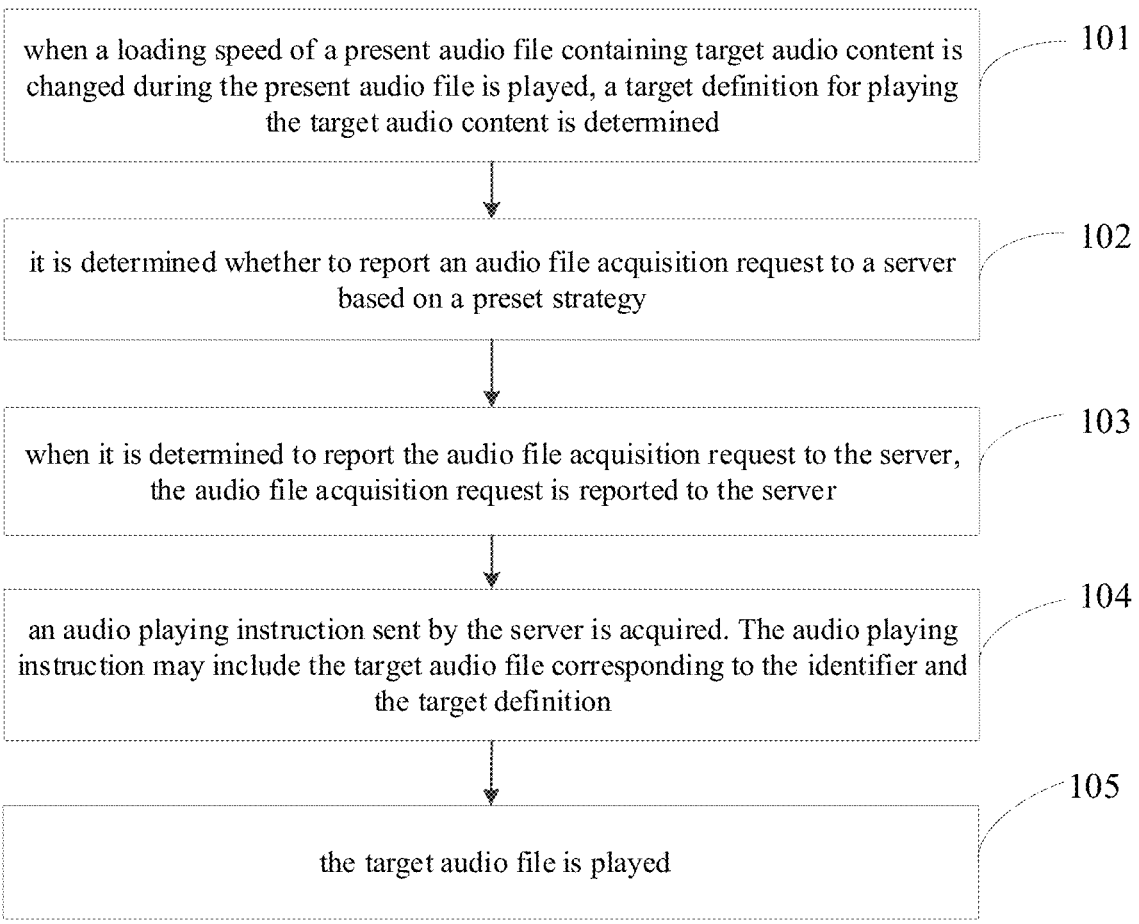
FIG. 1 is a flow chart of an audio playing method according to an embodiment of the present disclosure.

Embodiments of the present disclosure will be described in detail and examples of embodiments are illustrated in the drawings. The same or similar elements and the elements having same or similar functions are denoted by like reference numerals throughout the descriptions. Embodiments described herein with reference to drawings are explanatory, serve to explain the present disclosure, and are not construed to limit embodiments of the present disclosure.

In the related art, when the audio playing device plays music, if the music stuttering occurs, the audio playing device may prompt the user, which results in frequent prompting of the user and causing interference to the user when the number of times of the music stuttering is large, causing the poor use effect of the audio playing device. For that, an audio playing method is proposed.

With the audio playing method according to embodiments of the present disclosure, when a loading speed of a present audio file containing target audio content is changed during the present audio file is played, a target definition for playing the target audio content is determined. Then it is determined whether to report an audio file acquisition request to a server based on a preset strategy. If yes, the audio file acquisition request is reported to the server. Thus, an audio playing instruction sent by the server is acquired, and a target audio file corresponding to the target definition is played. Therefore, it may realize the self-adaptive control on the definition for playing the target audio content based on the present network condition of the audio playing device and the preset strategy, thereby improving the use effect of the audio playing device and the user experience.

The following describes an audio playing method, an audio playing apparatus, an audio playing device, and a server according to embodiments of the present disclosure with reference to the accompanying drawings.

The following takes a side of the audio playing device as an example to specifically describe the audio playing method provided in the embodiments of the present disclosure.

FIG. 1 is a flow chart of an audio playing method according to an embodiment of the present disclosure.

As illustrated in FIG. 1, the audio playing method include the acts in the following blocks.

In block 101, when a loading speed of a present audio file containing target audio content is changed during the present audio file is played, a target definition for playing the target audio content is determined.

In detail, the audio playing method provided in the embodiments of the present disclosure may be configured to be implemented in the audio playing device provided in the embodiments of the present disclosure. The audio playing device may be any terminal device that may play audio, such as a speaker, a mobile phone or a computer.

The change of the loading speed may be the decrease of the loading speed or the increase of the loading speed, which is not limited herein.

The target definition refers to the highest definition for playing the target audio content smoothly after the loading speed of the present audio file is changed.

In detail, the definition for playing the target audio content may be determined as a high definition, a normal definition, a smooth definition and the like based on a sampling accuracy of the audio file. For example, the definition for playing the target audio content may be determined as the high definition when the sampling accuracy of the audio file is 32 bit/192 KHZ (kilohertz) or more; the definition for playing the target audio content may be determined as the normal definition when the sampling accuracy of the audio file is 24 bit/96 KHZ-32 bit/192 KH; the definition for playing the target audio content may be determined as the smooth definition, the sampling accuracy of the audio file is 16 bit/44.1 KHZ-24 bit/96 KHZ; and so on.

In an implementation, a correspondence between the loading speeds and the definitions may be set in advance. When the loading speed of the present audio file is changed, the target definition may be determined based on the changed loading speed.

For example, it may be preset that, when the loading speed of the audio file is lower than 256 kilobit (Kb)/second (s), the corresponding definition is the smooth definition; when the loading speed is 256 Kb/s-512 Kb/s, the corresponding definition is the normal definition; when the loading speed is higher than 512 Kb/s, the corresponding definition is the high definition. If the loading speed of the present audio file is reduced from 300 Kb/s to 200 Kb/s, it may be determined that the target definition is the smooth definition.

In block 102, it is determined whether to report an audio file acquisition request to a server based on a preset strategy.

The preset strategy may be set as needed. For example, it may be based on an instruction of a user or other triggering conditions, which is not limited in this embodiment.

For example, in the process of playing audio, when the loading speed of the present audio file is reduced, the music stuttering may occur. At this time, if an instruction for switching the definition for playing the target audio content from the user is received, the audio playing device may directly report the audio file acquisition request to the server.

Alternatively, when the loading speed of the present audio file is changed, the audio playing device may also play a voice inquiry message to the user first, to ask the user whether to switch the definition for playing the target audio content. If the user selects the switching of the definition, the audio file acquisition request may be reported to the server.

Alternatively, it may be determined whether to report the audio file acquisition request to the server by the audio playing device based on the present network condition only. For example, in the process of playing audio, the loading speed of the present audio file is changed several times, and the audio playing device may determine that the present network condition is not stable, thereby reporting the audio file acquisition request to the server; or when the loading speed of the present audio file is changed, the audio playing device may play a voice inquiry message to the user to inquire of the user whether to switch the definition for playing the target audio content. If the confirmation instruction returned by the user is not received during a long time period, the audio playing device may report the audio file acquisition request to the server.

It should be noted that, the foregoing manners for determining whether to report the audio file acquisition request to the server is merely illustrative, and they cannot be used as a limitation on the technical solutions of the present disclosure. On these basis, skilled in the art may arbitrarily set the preset strategy based on requirements to determine whether to report the audio file acquisition request to the server, which is not limited herein.

In block 103, when it is determined to report the audio file acquisition request to the server, the audio file acquisition request is reported to the server. The audio file acquisition request may include the target definition and an identifier of a target audio file containing the target audio content.

The audio content of the target audio file is the same as the audio content of the present audio file, and the definition of the audio content of the target audio file is different from the definition of the audio content of the present audio file.

The identifier of the target audio file may be configured to uniquely identify the target audio file.

In block 104, an audio playing instruction sent by the server is acquired. The audio playing instruction may include the target audio file corresponding to the identifier and the target definition.

In block 105, the target audio file is played.

In detail, when the loading speed of the present audio file is changed and it is determined to report the audio file acquisition request to the server based on the preset strategy, the audio playing device may report the audio file acquisition request to the server so that the server will send the target audio file corresponding to the identifier and the target definition to the audio playing device. After acquiring the audio playing instruction sent by the server, the audio playing device may, based on the audio playing instruction, play the target audio file included in the audio playing instruction and corresponding to the identifier and the target definition, so as to implement the switching of the definition for playing the target audio content.

In a possible implementation, after the loading speed of the present audio file is changed, the previous loading speed may be restored in a short time period; or the loading speed of the present audio file may be changed frequently in a time period. Then, to avoid frequently reporting the audio file acquisition request to the server to change the definition for playing the target audio content, in the embodiment of the present disclosure, it is determined whether to report the audio file acquisition request to the server based on a specific condition of change of the loading speed of the present audio file. That is, the act in block 102 may specifically include the following.

It is determined whether to report the audio file acquisition request to the server, based on whether the loading speed is changed within a first time period threshold, and/or, whether a number of changes of the loading speed within a second time period threshold exceeds a first number threshold.

The first time period threshold, the second time period threshold and the first number threshold may be set as needed. For example, it may be determined based on empirical values, or based on the history record of the network environment, etc., which is not limited herein.

In detail, if the loading speed is not changed within the first time period threshold, that is, it is always in a higher or lower state after the loading speed of the present audio file is changed, it indicates that the network environment has changed. If the audio file with the present definition continues to be loaded, the music may be in a stuck state. Or if the number of changes of the loading speed within the second time period threshold exceeds the first number threshold, it indicates that the present network is unstable. If the audio file with the present definition continues to be loaded, the music is prone to intermittent situations. In either of the above two situations, or when both situations occur simultaneously, the audio playing device may report the audio file acquisition request to the server, so that the server sends the audio playing instruction to the audio playing device. After acquiring the audio playing instruction sent by the server, the audio playing device may, based on the audio playing instruction, play the target audio file included in the audio playing instruction and corresponding to the identifier and the target definition.

It should be understood that, after the loading speed of the present audio file is changed, the audio playing device may also play a voice inquiry message to the user, so as to determine whether to report the audio file acquisition request to the server based on a selection of the user, to switch the definition for playing the target audio content. That is, the act in block 102 may include the following.

A voice inquiry message is played to a user. The voice inquiry message is configured to inquire of the user whether to switch a definition for playing the target audio content.

It is determined whether to report the audio file acquisition request to the server based on an acquired instruction returned by the user.

In detail, after the loading speed of the present audio file is changed, the audio playing device may play the voice inquiry message, such as "since the present network state is quite unstable, please switch to the smooth mode to listen to music, is it OK?", so ask the user whether to switch the definition for playing the target audio content. After listening to the voice inquiry message, the user may input the instruction through the voice, such as "sure", "OK" or other with the same meaning. After the audio playing device acquires the instruction returned by the user, if it is determined that the acquired instruction of the user is a confirming instruction for switching the definition for playing the target audio content through voice recognition, the audio file acquisition request may be reported to the server by the audio playing device. Then the server may send the audio playing instruction to the audio playing device. After acquiring the audio playing instruction sent by the server, the audio playing device may, based on the audio playing instruction, play the target audio file included in the audio playing instruction and corresponding to the identifier and the target definition.

It should be noted that, the audio playing device may play the voice inquiry message to user after it is determined that the loading speed is not changed within the first time period threshold, or, the number of changes of the loading speed within the second time period threshold exceeds the first number threshold, to avoid frequently playing the voice inquiry message to the user and avoid causing the user's resentment. In this way, the use effect of the audio playing device may be improved and the user experience may be improved.

In addition, the audio playing device may also report a loading speed change event to the server after determining that the loading speed of the present audio file is changed, so that the server determines whether the audio playing device plays the voice inquiry message to the user or whether the audio playing device reports the audio file acquisition request to the server, so as to switch the definition for playing the target audio content. That is, before the act in block 103, the method may further include the following.

A loading speed change event is reported to the server at a preset time interval.

Correspondingly, before playing the voice inquiry message to the user, the method further includes the following.

A voice inquiry message playing instruction sent by the server is acquired.

The preset time interval may be set as needed. For example, it may be determined based on empirical values, or based on the history record of the network environment, which is not limited herein.

In detail, the audio playing device may report the loading speed change event to the server at the preset time interval, so that the server may send the voice inquiry message playing instruction to the audio playing device based on a specific change of the loading speed. After the audio playing device acquires the voice inquiry message playing instruction sent by the server, it may play the voice inquiry message to the user, so that the user may select whether to switch the definition for playing the target audio content or not.

It should be noted that, after acquiring the audio playing instruction sent by the server, the audio playing device may start to play the target audio file from the beginning or from the moment of stopping playing the audio file when the loading speed is changed.

That is, the audio playing instruction may further include a starting playing moment.

Correspondingly, the act in block 104 may include the following.

The target audio file is played based on the starting playing moment.

The starting playing moment may be determined based on a playing progress of the present audio file by the server or by the audio playing device when the loading speed is changed, which is not limited herein.

In detail, after the audio playing device acquires the audio playing instruction sent by the server, it may start from the starting playing moment to play the target audio file, so that the user does not need to listen to the already played audio file again, thereby improving the effect of the audio playing device and the user experience.

In addition, if there is a failure when the audio playing device reports the audio file acquisition request to the server or reports the loading speed change event to the server, it may determine that the present network environment is extremely poor, and even if a minimum-definition audio file is played, it will be stuck. At this point, the audio playing device may play a prompt message such as "the present network is not available, please check the network" to the user to prompt the user to check whether the network is available.

With the audio playing method according to the embodiments of the present disclosure, when the loading speed of the present audio file containing the target audio content is changed during the present audio file is played, the target definition for playing the target audio content is determined. Then it is determined whether to report the audio file acquisition request to the server based on the preset strategy. If yes, the audio file acquisition request is reported to the server. Thus, the audio playing instruction sent by the server may be acquired, and the target audio file included in the audio playing instruction and corresponding to the identifier and the target definition is played. Therefore, it may realize the self-adaptive control on the definition for playing the target audio content based on the present network condition of the audio playing device and the preset strategy, thereby improving the use effect of the audio playing device and the user experience.

Through the above analysis, it may be known that, when playing the present audio file, if it is determined that the loading speed of the present audio file is changed, the target definition for playing the audio file may be determined. After the voice inquiry message is played to the user, the definition for playing the target audio content may be switched based on the confirmation instruction returned by the user. In practical use, after the audio playing device plays the voice inquiry message to the user, the confirmation instruction returned by the user may not be received. The following describes this condition in detail with reference to FIG. 2.

Figure 2:
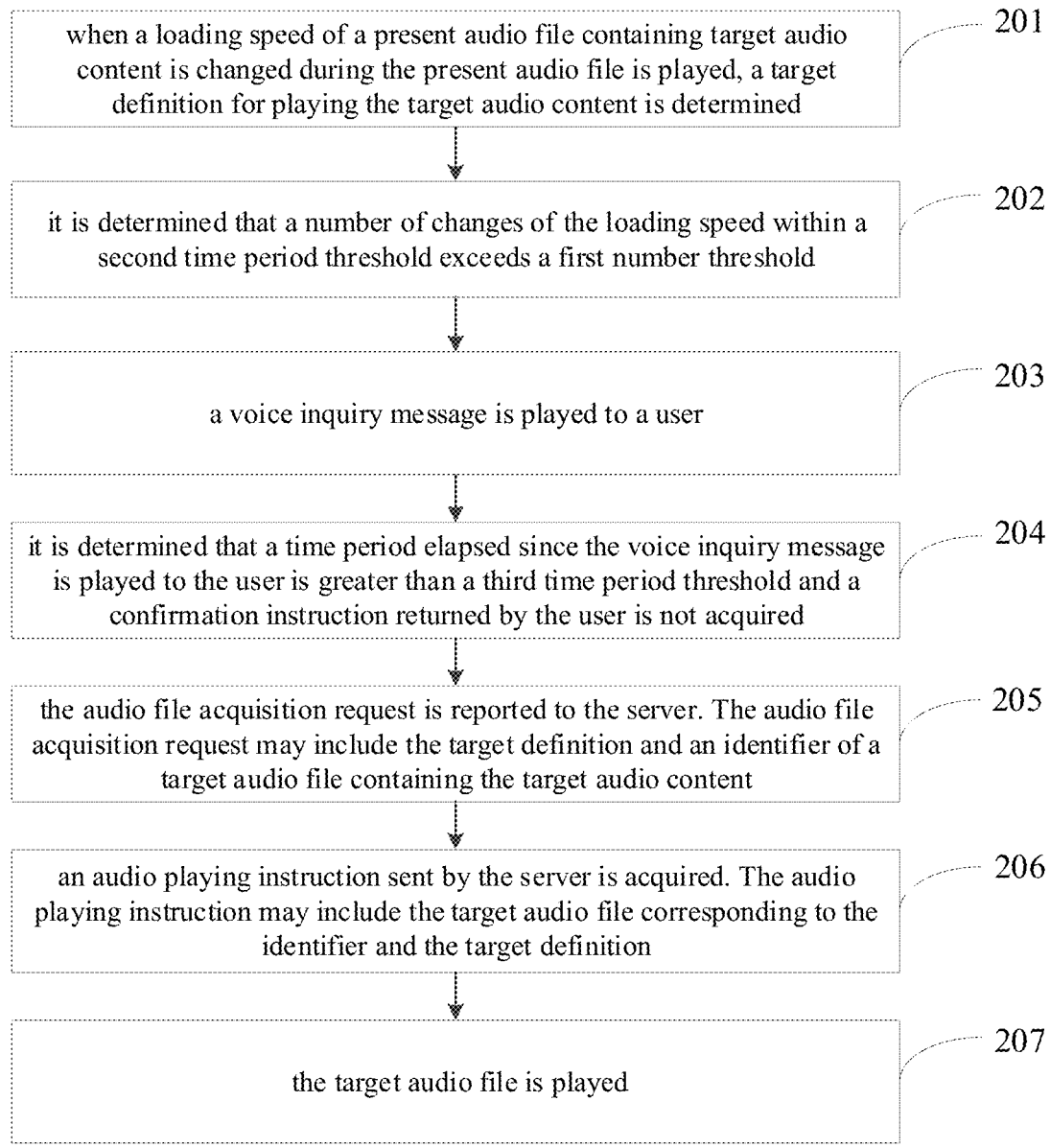
FIG. 2 is a flow chart of an audio playing method according to another embodiment of the present disclosure.

FIG. 2 is a flow chart of an audio playing method according to another embodiment of the present disclosure.

As illustrated in FIG. 2, the audio playing method include the acts in the following blocks.

In block 201, when a loading speed of a present audio file containing target audio content is changed during the present audio file is played, a target definition for playing the target audio content is determined.

In block 202, it is determined that a number of changes of the loading speed within a second time period threshold exceeds a first number threshold.

In block 203, a voice inquiry message is played to a user.

The voice inquiry message is configured to inquire of the user whether to switch a definition for playing the target audio content.

In block 204, it is determined that a time period elapsed since the voice inquiry message is played to the user is greater than a third time period threshold and a confirmation instruction returned by the user is not acquired.

The third time period threshold may be set as needed. For example, it may be determined based on an empirical value, or based on the history record of instructions returned by the user, which is not limited herein.

In block 205, the audio file acquisition request is reported to the server. The audio file acquisition request may include the target definition and an identifier of a target audio file containing the target audio content.

In block 206, an audio playing instruction sent by the server is acquired. The audio playing instruction may include the target audio file corresponding to the identifier and the target definition.

In block 207, the target audio file is played.

For the implementation process and principle of the acts in above blocks 201-203 and 205-207, the reference may be made to the detailed description of the acts in above blocks 101-104 in the foregoing embodiment, and details are not described herein again.

In detail, if the audio playing device plays the voice inquiry message to the user, to ask the user whether to switch the definition for playing the target audio content, and if the time period elapsed since the voice inquiry message is played to the user is greater than the third time period threshold and the confirmation instruction returned by the user is not acquired, it may be considered that the user may be far from the audio playing device and the inquiry message played by the audio playing device may not be heard, or the audio playing device may not recognize the instruction of the user. At this time, the audio playing device may report the audio file acquisition request to the server and switch the definition for playing the target audio content based on the audio playing instruction sent by the server.

In addition, after the audio playing device plays a plurality of inquiry message for inquiring of the user whether to switch the definition for playing the target audio content to the user, the confirmation instruction returned by the user may not be acquired. In this case, the audio file acquisition request may also be reported to the server and the definition for playing the target audio content may be switched based on the audio playing instruction sent by the server. That is, the act in block 204 may also be the following.

When a number of occurrences of playing the voice inquiry message to the user is greater than a second number threshold and a confirmation instruction returned by the user is not acquired, it is determined to report the audio file acquisition request to the server.

In detail, after the audio playing device plays the inquiry message for inquiring of the user whether to switch the definition for playing the target audio content, and the number of occurrences of playing the voice inquiry message to the user is multiple and the confirmation instruction returned by the user is not acquired, it may be considered that the user may be far from the audio playing device and the inquiry message played by the audio playing device may not be heard, or the audio playing device may not recognize the instruction of the user. At this time, the audio playing device may report the audio file acquisition request to the server and switch the definition for playing the target audio content based on the audio playing instruction sent by the server.

Through the above manners, when the user is far away from the audio playing device and cannot interact with the audio playing device, the definition for playing the target audio content may still be adaptively controlled. Therefore, the use effect of the audio playing device is improved and the user experience is improved.

With the audio playing method according to the embodiments of the present disclosure, when the loading speed of the present audio file containing the target audio content is changed during the present audio file is played, the target definition for playing the target audio content is determined. When it is determined that the number of changes of the loading speed within the second time period threshold exceeds the first number threshold, the inquiry message for inquiring of the user whether to switch the definition for playing the target audio content may be played to the user. When the time period elapsed since the voice inquiry message is played to the user is greater than the third time period threshold and the confirmation instruction returned by the user is not acquired, the audio file acquisition request is reported to the server. Thus, the audio playing instruction sent by the server may be acquired, and the target audio file included in the audio playing instruction and corresponding to the identifier and the target definition is played. Therefore, it may realize the self-adaptive control on the definition for playing the target audio content based on the present network condition of the audio playing device and the preset strategy, thereby improving the use effect of the audio playing device and the user experience.

The following takes a side of the server device as an example to specifically describe the audio playing method provided in the embodiments of the present disclosure.

Figure 3:
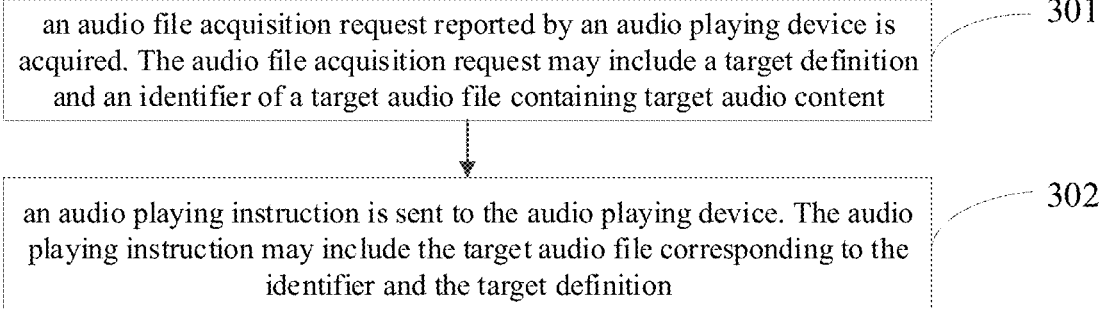
FIG. 3 is a flow chart of an audio playing method according to another embodiment of the present disclosure.

FIG. 3 is a flow chart of an audio playing method according to another embodiment of the present disclosure.

As illustrated in FIG. 3, the audio playing method include the acts in the following blocks.

In block 301, an audio file acquisition request reported by an audio playing device is acquired. The audio file acquisition request may include a target definition and an identifier of a target audio file containing target audio content.

In detail, the audio playing method provided in the embodiments of the present disclosure may be configured to be implemented in the server provided in the embodiments of the present disclosure.

In block 302, an audio playing instruction is sent to the audio playing device. The audio playing instruction may include the target audio file corresponding to the identifier and the target definition.

For a description of the identifier and the target definition, the reference may be made to the related description of the foregoing embodiments, and details are not described herein again.

During an implementation, when the audio playing device plays the audio file, if it is determined that the loading speed of the present audio file is changed, the target definition may be determined. And then the audio file acquisition request containing the identifier and the target definition may be reported to the server. After receiving the audio file acquisition request reported by the audio playing device, the server may send the audio playing instruction to the audio playing device. The audio playing device plays the target audio file corresponding to the identifier and the target definition based on the audio playing instruction.

It should be understood that, after the loading speed of the present audio file is changed, the audio playing device may play a voice inquiry message to the user. The user may determine whether to perform the switching of the definition for playing the target audio content. In a possible implementation of the present disclosure, the audio playing device may report the loading speed change event to the server. The server determines whether the audio playing device plays the voice inquiry message to the user based on the loading speed change event. That is, before the act in block 301, the method further includes the followings.

A loading speed change event reported by the audio playing device is acquired.

It is determined whether a number of occurrences of the loading speed change event reported by the audio playing device within a second time period threshold exceeds a first number threshold.

When the number of occurrences of the loading speed change event reported by the audio playing device within the second time period threshold exceeds the first number threshold, a voice inquiry message playing instruction is sent to the audio playing device. The voice inquiry message playing instruction is configured to instruct the audio playing device to play a voice inquiry message to the user. The voice inquiry message is configured to inquire of the user whether to switch a definition for playing the target audio content.

The second time period threshold and the first number threshold may be set as needed. For example, it may be determined based on empirical values, or based on the history of the network environment, etc., which is not limited herein.

In detail, the number of occurrences of the loading speed change event reported by the audio playing device within the second time period threshold exceeds the first number threshold, it indicates that the present network of the audio playing device is unstable. If the audio file with the present definition continues to be loaded, the music is prone to intermittent situations. Then, the server may send the voice inquiry message playing instruction to the audio playing device. The audio playing device plays the voice inquiry message to the user accordingly, thereby enabling the user to select whether to perform the switching of the definition for playing the target audio content.

If the user returns the confirmation instruction, the audio playing device may report the audio file acquisition request to the server. Then the server may send the audio playing instruction to the audio playing device. The audio playing device plays the target audio file and achieves the switching of the definition for playing the target audio content.

Through the above manner, it may be avoided that the audio playing device frequently plays the voice inquiry message to the user after the network condition is changed, which causes the user to feel disgusted, thereby improving the use effect of the audio playing device and the user experience.

It should be noted that, the audio playing instruction sent by the server to the audio playing device may include a starting playing moment. The audio playing device may play the target audio file based on the starting playing moment.

That is, before the act in block 302, the method may further include the following.

A playing progress of a present audio file played by the audio playing device is determined.

A starting playing moment of the target audio file is determined based on the playing progress.

Correspondingly, the act in block 302 may include the following.

The audio playing instruction including the starting playing moment is sent to the audio playing device.

In detail, the server may determine the starting playing moment of the target audio file based on the playing progress of the present audio file when the loading speed of the present audio file is changed in the audio playing device, and send the audio playing instruction containing the starting playing moment to the audio playing device. The audio playing device may acquire the audio playing instruction sent by the server and play the target audio file starting from the starting playing moment. In this way, the user does not need to listen to the already played audio file again, thereby improving the effect of the audio playing device and the user experience.

For example, it is assumed that the audio playing device plays the present audio file, the loading speed is changed when it reaches 03:00. After the audio playing device reports the audio file acquisition request to the server, the server may determine that the starting playing moment of the target audio file is 03:00 based on the playing progress of the present audio file. After the server sends the audio playing instruction containing 03:00 to the audio playing device, the audio playing device may start playing the target audio file from 03:00.

With the audio playing method according to the embodiments of the present disclosure, when the audio file acquisition request reported by the audio playing device is acquired, the audio playing instruction may be sent to the audio playing device. Therefore, it may realize the self-adaptive control on the definition for playing the target audio content based on the present network condition of the audio playing device and the preset strategy, thereby improving the use effect of the audio playing device and the user experience.

Through the above analysis, it may be known that, the server may send the voice inquiry message playing instruction to the audio playing device based on the loading speed change event reported by the audio playing device. The audio playing device plays the voice inquiry message. When the confirmation instruction is returned by the user to the audio playing device, the audio playing device reports the audio file acquisition request to the server. The server may send the audio playing instruction to the audio playing device based on the audio file acquisition request reported by the audio playing device. The audio playing device plays the target audio file after the definition is switched. In practical use, after the audio playing device plays the voice inquiry message, the confirmation instruction returned by the user may not be received, and thus the server may not receive the audio file acquisition request reported by the audio playing device. The following describes the above situation in detail with reference to FIG. 4.

Figure 4:
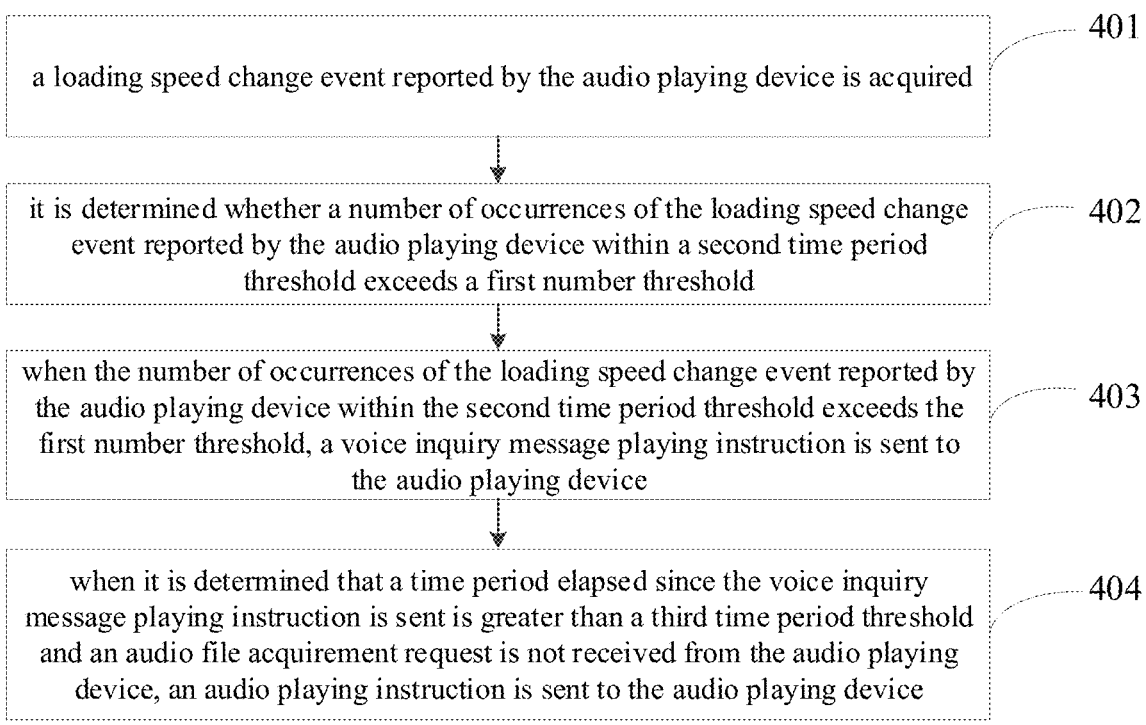
FIG. 4 is a flow chart of an audio playing method according to another embodiment of the present disclosure.

FIG. 4 is a flow chart of an audio playing method according to another embodiment of the present disclosure.

As illustrated in FIG. 4, the audio playing method include the acts in the following blocks.

In block 401, a loading speed change event reported by the audio playing device is acquired.

In block 402, it is determined whether a number of occurrences of the loading speed change event reported by the audio playing device within a second time period threshold exceeds a first number threshold.

In block 403, when the number of occurrences of the loading speed change event reported by the audio playing device within the second time period threshold exceeds the first number threshold, a voice inquiry message playing instruction is sent to the audio playing device.

The voice inquiry message playing instruction is configured to instruct the audio playing device to play a voice inquiry message to the user. The voice inquiry message is configured to inquire of the user whether to switch a definition for playing the target audio content.

In block 404, when it is determined that a time period elapsed since the voice inquiry message playing instruction is sent is greater than a third time period threshold and an audio file acquirement request is not received from the audio playing device, an audio playing instruction is sent to the audio playing device.

For an implementation process and principle of the above acts in above blocks 401-403, the reference may be made to the detailed description of the acts in above blocks 301-302 in the foregoing embodiment, and details are not described herein again.

In detail, after the server sends the voice inquiry message playing instruction to the audio playing device, if it is determined that the time period elapsed since the voice inquiry message playing instruction is sent to the audio playing device is greater than the third time period threshold and the audio file acquirement request is not received from the audio playing device, it may be considered that the user may be far from the audio playing device and the inquiry message played by the audio playing device may not be heard, or the audio playing device may not recognize the instruction of the user. At this time, the server may send the audio playing instruction to the audio playing device. The audio playing device plays the target audio file after the definition is switched.

In addition, if the server does not receive the audio file acquisition request reported by the audio playing device after sending a plurality of voice inquiry message playing instructions to the audio playing device, the server may send the audio playing instruction to the audio playing device. The audio playing device plays the target audio file after the definition is switched. That is, the act in block 404 may also be the following.

When it is determined that a number of occurrences of sending the voice inquiry message playing instruction to the audio playing device is greater than a second number threshold and the audio file acquisition request reported by the audio playing device is not acquired, the audio playing instruction is sent to the audio playing device.

In detail, after the server sends the voice inquiry message playing instruction to the audio playing device, if it is determined that the number of occurrences of sending the voice inquiry message playing instruction to the audio playing device is greater than the second number threshold and the audio file acquisition request reported by the audio playing device is not acquired, it may be considered that the user may be far from the audio playing device and the inquiry message played by the audio playing device may not be heard, or the audio playing device may not recognize the instruction of the user. At this time, the server may send the audio playing instruction to the audio playing device. The audio playing device plays the target audio file after the definition is switched.

Through the above manners, when the user is far away from the audio playing device and cannot interact with the audio playing device, the definition for playing the target audio content may still be adaptively controlled. Therefore, the use effect of the audio playing device is improved and the user experience is improved.

It should be noted that, when the server does not acquire the audio file acquisition request including the identifier and the target definition and reported by the audio playing device, it may determine a target definition achievable currently by the audio playing device based on the loading speed change event reported by the audio playing device. That is, the act in block 404, before sending the audio playing instruction to the audio playing device, the method further includes the following.

A target definition achievable currently by the audio playing device is determined based on the loading speed change event reported by the audio playing device.

In detail, the server may determine the present network state of the audio playing device based on the loading speed change event reported by the audio playing device to determine the target definition that can be achieved by the audio playing device and determine the identifier of the target audio file based on the present audio file played by the audio playing device. When the audio playing instruction is sent to the audio playing device, the target audio file corresponding to the identifier and the determined target definition may be sent to the audio playing device. The audio playing device may switch the definition for playing the target audio content.

With the audio playing method according to the embodiments of the present disclosure, firstly, the loading speed change event reported by the audio playing device is acquired. Then it is determined whether the number of occurrences of the loading speed change event reported by the audio playing device within the second time period threshold exceeds the first number threshold. If yes, the voice inquiry message playing instruction is sent to the audio playing device. If it is determined that the time period elapsed since the voice inquiry message playing instruction is sent to the audio playing device is greater than the third time period threshold and the audio file acquisition request reported by the audio playing device is not acquired, the audio playing instruction is sent to the audio playing device. Therefore, it may realize the self-adaptive control on the definition for playing the target audio content based on the present network condition of the audio playing device and the preset strategy, thereby improving the use effect of the audio playing device and the user experience.

Figure 5:
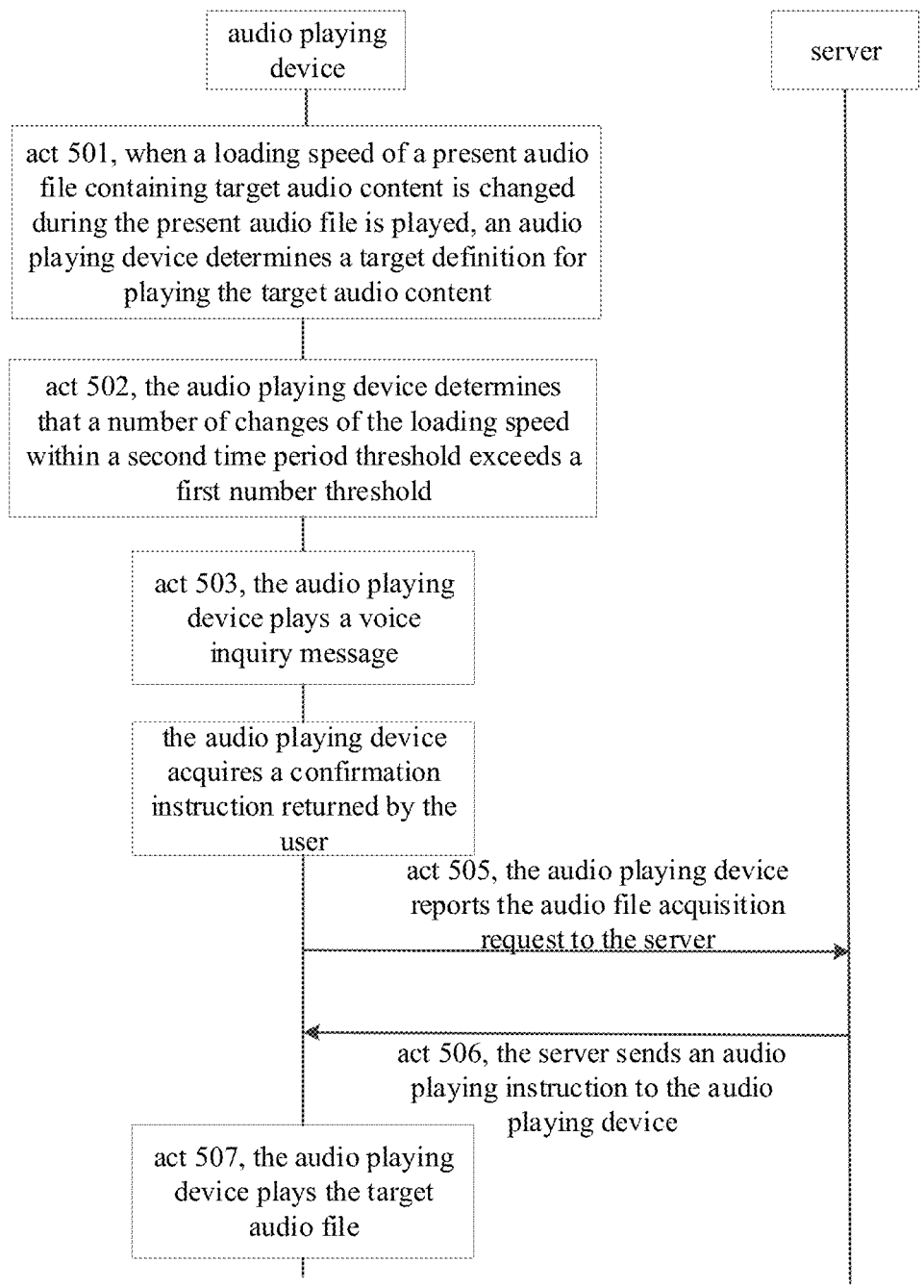
FIG. 5 is a signaling interaction diagram of an audio playing method according to an embodiment of the present disclosure.

FIG. 5 is a signaling interaction diagram of an audio playing method according to an embodiment of the present disclosure.

As illustrated in FIG. 5, the audio playing method may include the following acts.

In act 501, when a loading speed of a present audio file containing target audio content is changed during the present audio file is played, an audio playing device determines a target definition for playing the target audio content.

In act 502, the audio playing device determines that a number of changes of the loading speed within a second time period threshold exceeds a first number threshold.

In act 503, the audio playing device plays a voice inquiry message.

The voice inquiry message is configured to inquire of the user whether to switch a definition for playing the target audio content.

In act 504, the audio playing device acquires a confirmation instruction returned by the user.

In act 505, the audio playing device reports the audio file acquisition request to the server.

The audio file acquisition request may include the target definition and an identifier of a target audio file containing the target audio content.

In act 506, the server sends an audio playing instruction to the audio playing device. The audio playing instruction may include the target audio file corresponding to the identifier and the target definition.

In act 507, the audio playing device plays the target audio file.

In detail, the audio playing device may play the voice inquiry message to the user based on the change of the loading speed and acquires the target audio file corresponding to the identifier and the target definition from the server after obtaining the confirmation instruction returned by the user, to switch the definition for playing the target audio content.

Through the above process, it may realize the self-adaptive control on the definition for playing the target audio content based on the present network condition of the audio playing device and the preset strategy, thereby improving the use effect of the audio playing device and the user experience.

Figure 6:
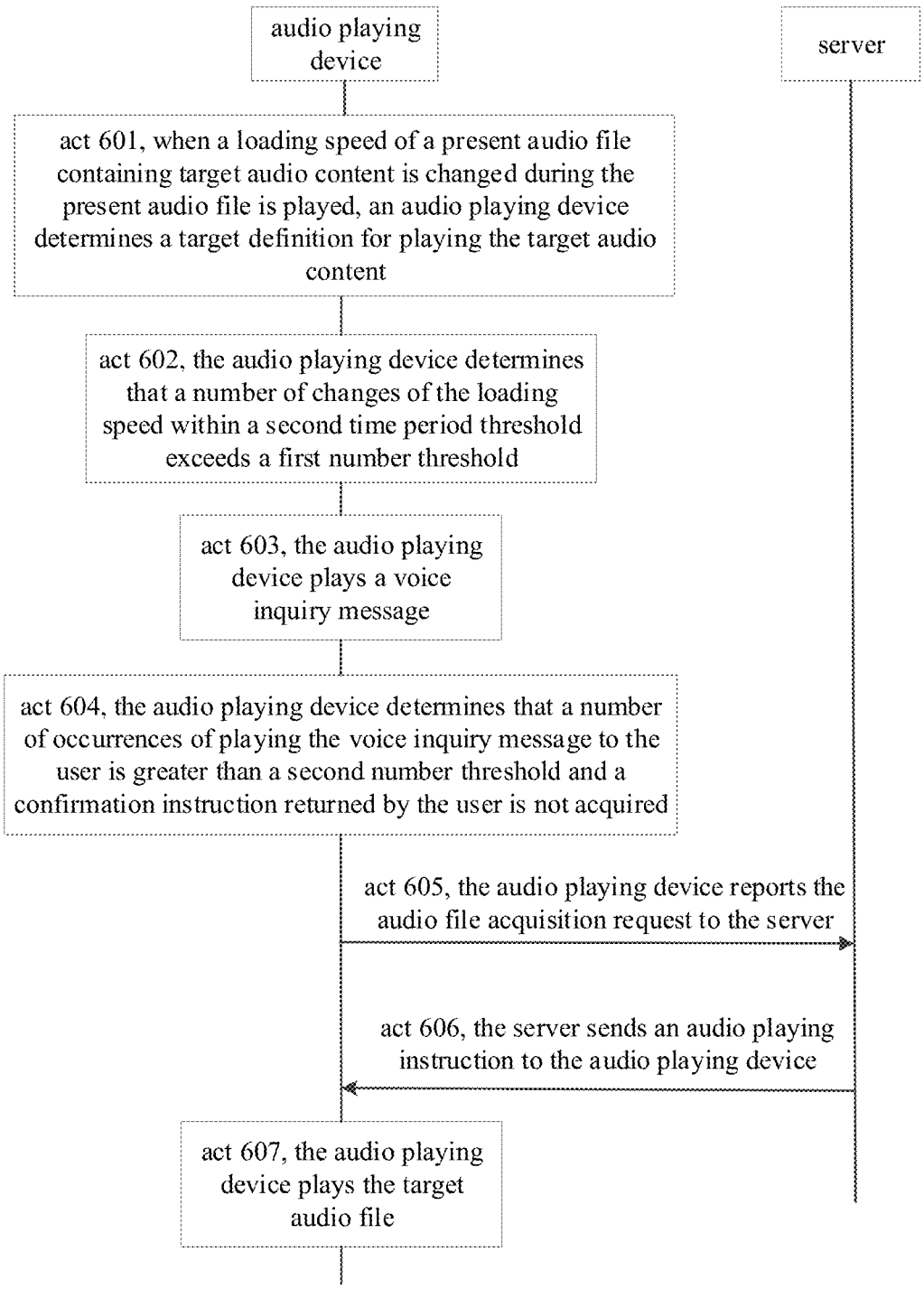
FIG. 6 is a signaling interaction diagram of an audio playing method according to another embodiment of the present disclosure.

FIG. 6 is a signaling interaction diagram of an audio playing method according to another embodiment of the present disclosure.

As illustrated in FIG. 6, the audio playing method may include the following acts.

In act 601, when a loading speed of a present audio file containing target audio content is changed during the present audio file is played, an audio playing device determines a target definition for playing the target audio content.

In act 602, the audio playing device determines that a number of changes of the loading speed within a second time period threshold exceeds a first number threshold.

In act 603, the audio playing device plays a voice inquiry message.

In act 604, the audio playing device determines that a number of occurrences of playing the voice inquiry message to the user is greater than a second number threshold and a confirmation instruction returned by the user is not acquired.

In act 605, the audio playing device reports the audio file acquisition request to the server.

The audio file acquisition request may include the target definition and an identifier of a target audio file containing the target audio content.

In act 606, the server sends an audio playing instruction to the audio playing device.

The audio playing instruction may include the target audio file corresponding to the identifier and the target definition.

In act 607, the audio playing device plays the target audio file.

In detail, the audio playing device may play the voice inquiry message to the user based on the change of the loading speed and acquires the target audio file corresponding to the identifier and the target definition from the server when the number of occurrences of playing the voice inquiry message to the user is greater than the second number threshold and the confirmation instruction returned by the user is not acquired, so as to switch the definition for playing the target audio content.

Through the above process, it may realize the self-adaptive control on the definition for playing the target audio content based on the present network condition of the audio playing device and the preset strategy, thereby improving the use effect of the audio playing device and the user experience.

Figure 7:
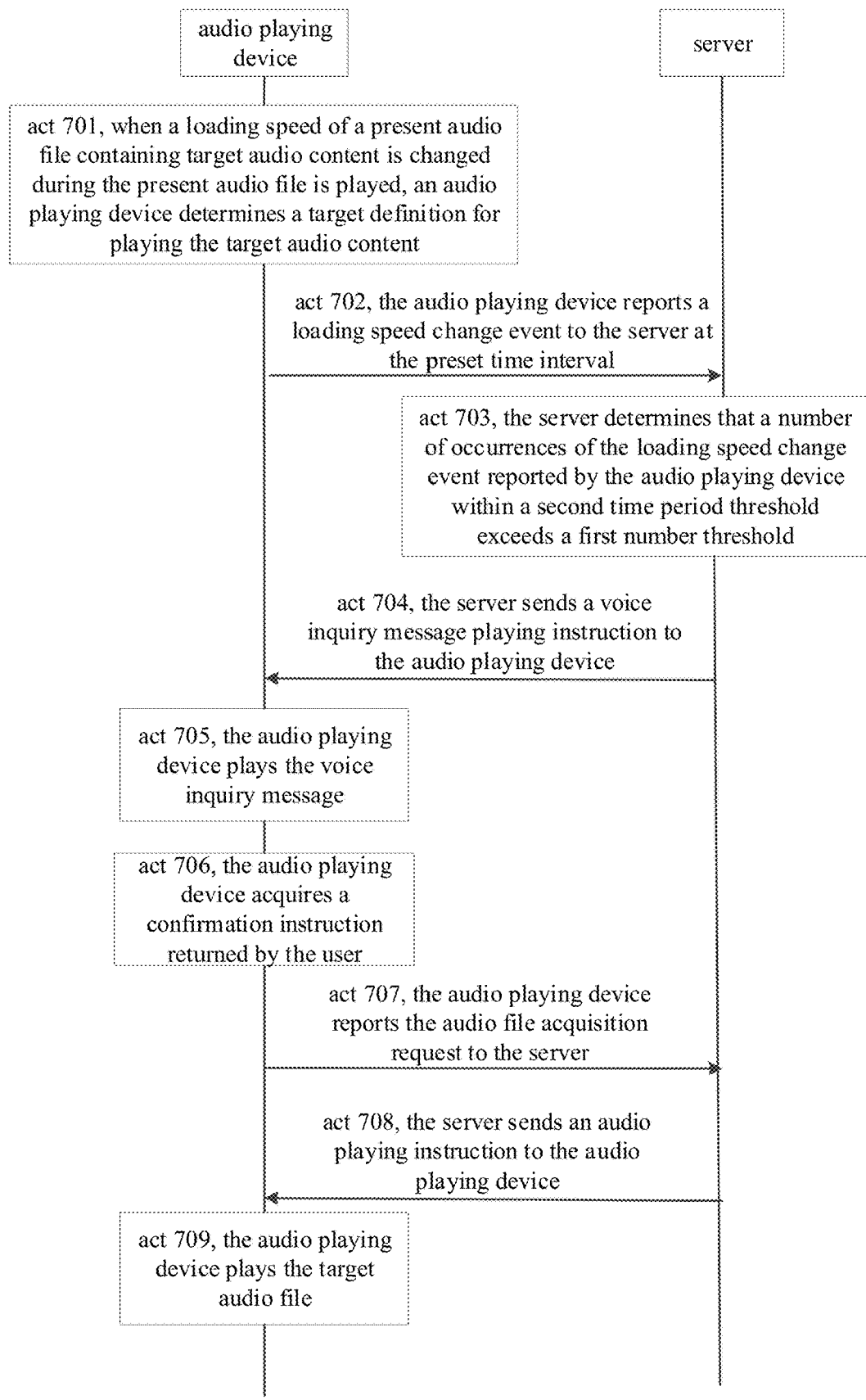
FIG. 7 is a signaling interaction diagram of an audio playing method according to another embodiment of the present disclosure.

FIG. 7 is a signaling interaction diagram of an audio playing method according to another embodiment of the present disclosure.

As illustrated in FIG. 7, the audio playing method may include the following acts.

In act 701, when a loading speed of a present audio file containing target audio content is changed during the present audio file is played, an audio playing device determines a target definition for playing the target audio content.

In act 702, the audio playing device reports a loading speed change event to the server at the preset time interval.

In act 703, the server determines that a number of occurrences of the loading speed change event reported by the audio playing device within a second time period threshold exceeds a first number threshold.

In act 704, the server sends a voice inquiry message playing instruction to the audio playing device.

The voice inquiry message playing instruction is configured to instruct the audio playing device to play a voice inquiry message to the user. The voice inquiry message is configured to inquire of the user whether to switch a definition for playing the target audio content.

In act 705, the audio playing device plays the voice inquiry message.

In act 706, the audio playing device acquires a confirmation instruction returned by the user.

In act 707, the audio playing device reports the audio file acquisition request to the server.

The audio file acquisition request may include the target definition and an identifier of a target audio file containing the target audio content.

In act 708, the server sends an audio playing instruction to the audio playing device.

The audio playing instruction may include the target audio file corresponding to the identifier and the target definition.

In act 709, the audio playing device plays the target audio file.

In detail, the server may send the voice inquiry message playing instruction to the audio playing device based on the loading speed change event reported by the audio playing device. After acquiring the voice inquiry message playing instruction, the audio playing device may play the voice inquiry message to the user, and acquire the confirmation instruction returned by the user, and then acquire the target audio file corresponding to the identifier and the target definition from the server so as to switch the definition for playing the target audio content.

Through the above process, it may realize the self-adaptive control on the definition for playing the target audio content based on the present network condition of the audio playing device and the preset strategy, thereby improving the use effect of the audio playing device and the user experience.

Figure 8:
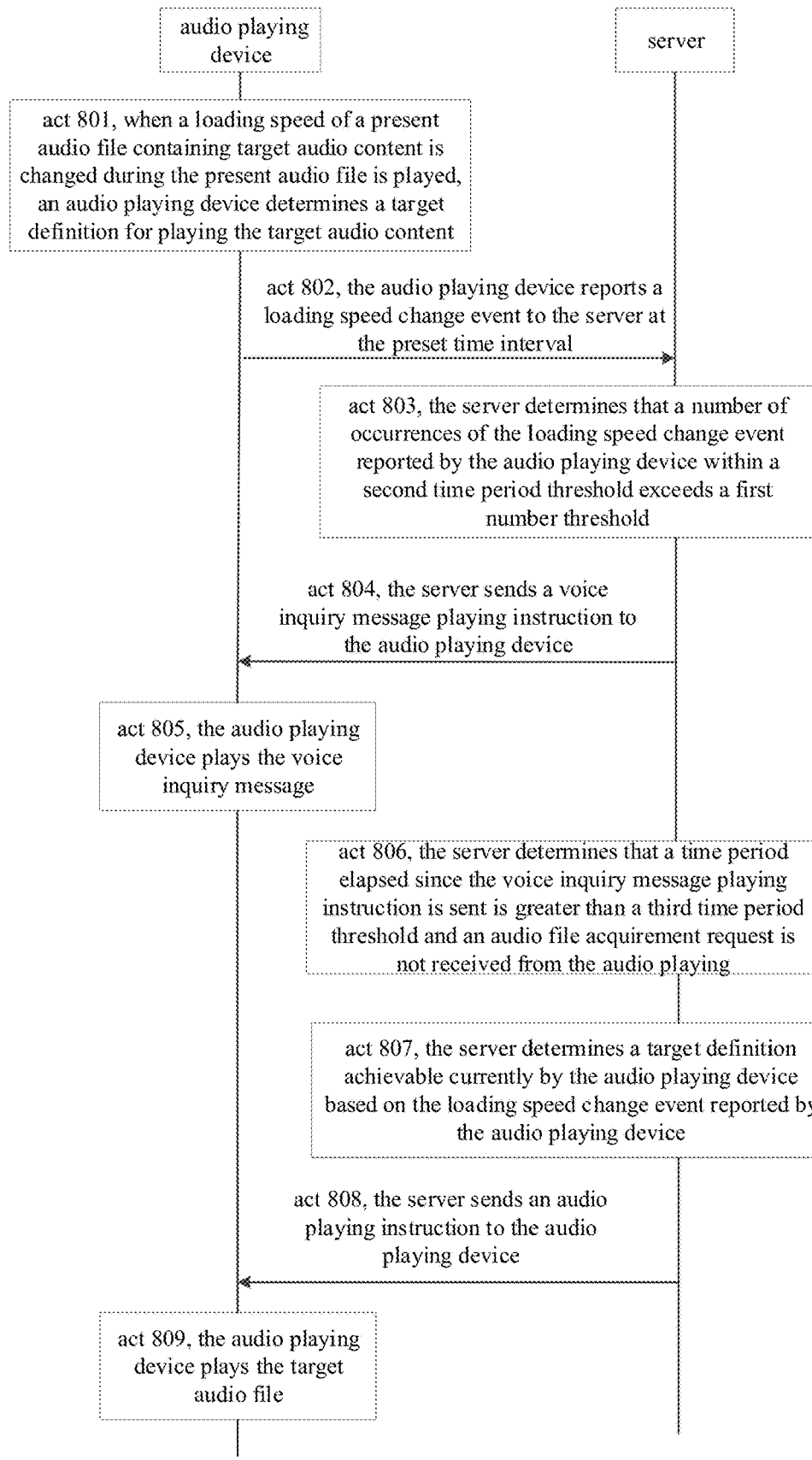
FIG. 8 is a signaling interaction diagram of an audio playing method according to another embodiment of the present disclosure.

FIG. 8 is a signaling interaction diagram of an audio playing method according to another embodiment of the present disclosure.

As illustrated in FIG. 8, the audio playing method may include the following acts.

In act 801, when a loading speed of a present audio file containing target audio content is changed during the present audio file is played, an audio playing device determines a target definition for playing the target audio content.

In act 802, the audio playing device reports a loading speed change event to the server at the preset time interval.

In act 803, the server determines that a number of occurrences of the loading speed change event reported by the audio playing device within a second time period threshold exceeds a first number threshold.

In act 804, the server sends a voice inquiry message playing instruction to the audio playing device.

The voice inquiry message playing instruction is configured to instruct the audio playing device to play a voice inquiry message to the user. The voice inquiry message is configured to inquire of the user whether to switch a definition for playing the target audio content.

In act 805, the audio playing device plays the voice inquiry message.

In act 806, the server determines that a time period elapsed since the voice inquiry message playing instruction is sent is greater than a third time period threshold and an audio file acquirement request is not received from the audio playing.

In act 807, the server determines a target definition achievable currently by the audio playing device based on the loading speed change event reported by the audio playing device.

In act 808, the server sends an audio playing instruction to the audio playing device.

The audio playing instruction may include the target audio file corresponding to the identifier and the target definition.

It should be noted that, when the server does not acquire the audio file acquisition request reported by the audio playing device, it may determine the identifier of the target audio file based on the present audio file played by the audio playing device, and determine the target definition achievable currently by the audio playing device based on the loading speed change event reported by the audio playing device. Therefore, the audio playing instruction sent to the audio playing device may include the target audio file corresponding to the identifier and the target definition.

In act 809, the audio playing device plays the target audio file.

In detail, the server may send the voice inquiry message playing instruction to the audio playing device based on the loading speed change event reported by the audio playing device. After acquiring the voice inquiry message playing instruction, the audio playing device may play the voice inquiry message to the user. If the server determines that the time period elapsed since the voice inquiry message playing instruction is sent is greater than the third time period threshold and the audio file acquirement request is not received from the audio playing device, it sends the audio playing instruction to the audio playing device, as to switch the definition for playing the target audio content.

Through the above process, it may realize the self-adaptive control on the definition for playing the target audio content based on the present network condition of the audio playing device and the preset strategy, thereby improving the use effect of the audio playing device and the user experience.

Figure 9:
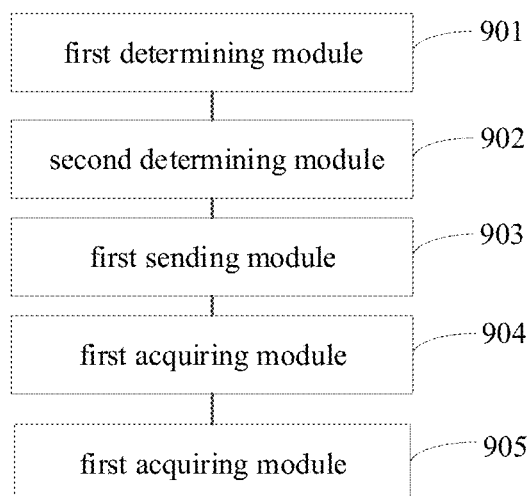
FIG. 9 is a block diagram illustrating an audio playing apparatus according to an embodiment of the present disclosure.

FIG. 9 is a block diagram illustrating an audio playing apparatus according to an embodiment of the present disclosure.

As illustrated in FIG. 9, the audio playing apparatus may include a first determining module 901, a second determining module 902, a first sending module 903, a first acquiring module 904 and a first acquiring module 905.

The first determining module 901 is configured to, when a loading speed of a present audio file containing target audio content is changed during the present audio file is played, determine a target definition for playing the target audio content.

The second determining module 902 is configured to, determine whether to report an audio file acquisition request to a server based on a preset strategy.

The first sending module 903 is configured to, when it is determined to report the audio file acquisition request to the server, report the audio file acquisition request to the server, the audio file acquisition request comprising the target definition and an identifier of a target audio file containing the target audio content.

The first acquiring module 904 is configured to, acquire an audio playing instruction sent by the server, the audio playing instruction comprising the target audio file corresponding to the identifier and the target definition.

The first playing module 905 is configured to play the target audio file.

In detail, the audio playing apparatus provided in this embodiment may be configured in any terminal device that may play audio, such as any smart speaker, mobile phone, or computer, for executing the audio playing method performed at the side of the audio playing device.

In a possible implementation of the embodiment of the present disclosure, the above-mentioned second determining module 902 is specifically configured to: determine whether to report the audio file acquisition request to the server, based on whether the loading speed is changed within a first time period threshold, and/or, whether a number of changes of the loading speed within a second time period threshold exceeds a first number threshold.

In a possible implementation of the embodiment of the present disclosure, the above-mentioned second determining module 902 is further configured to: play a voice inquiry message to a user, the voice inquiry message being configured to inquire of the user whether to switch a definition for playing the target audio content; determine whether to report the audio file acquisition request to the server based on an acquired instruction returned by the user.

In a possible implementation of the embodiment of the present disclosure, the above-mentioned second determining module 902 is further configured to: when a time period elapsed since the voice inquiry message is played to the user is greater than a third time period threshold and a confirmation instruction returned by the user is not acquired, determine to report the audio file acquisition request to the server; or a number of occurrences of playing the voice inquiry message to the user is greater than a second number threshold and a confirmation instruction returned by the user is not acquired, determine to report the audio file acquisition request to the server.

In a possible implementation of the embodiment of the present disclosure, the audio playing apparatus further includes a second sending module and a second acquiring module.

The second sending module is configured to report a loading speed change event to the server at a preset time interval.

The second acquiring module is configured to acquire a voice inquiry message playing instruction sent by the server.

In a possible implementation of the embodiment of the present disclosure, the audio playing instruction further includes a starting playing moment. The above-mentioned the first playing module 905 is configured to: play the target audio file based on the starting playing moment.

It should be noted that, the foregoing explanation of the embodiment of the audio playing method performed at the side of the audio playing device also be applicable to the audio playing apparatus of this embodiment, which will not be described here.

With the audio playing apparatus according to the embodiments of the present disclosure, when the loading speed of the present audio file containing the target audio content is changed during the present audio file is played, the target definition for playing the target audio content is determined. Then it is determined whether to report the audio file acquisition request to the server based on the preset strategy. If yes, the audio file acquisition request is reported to the server. Thus, the audio playing instruction sent by the server may be acquired, and the target audio file included in the audio playing instruction and corresponding to the identifier and the target definition is played. Therefore, it may realize the self-adaptive control on the definition for playing the target audio content based on the present network condition of the audio playing device and the preset strategy, thereby improving the use effect of the audio playing device and the user experience.

Figure 10:
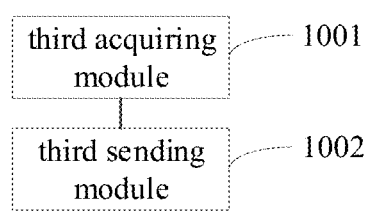
FIG. 10 is a block diagram illustrating an audio playing apparatus according to another embodiment of the present disclosure.

FIG. 10 is a block diagram illustrating an audio playing apparatus according to another embodiment of the present disclosure.

As illustrated in FIG. 10, the audio playing apparatus may include a third acquiring module 1001 and a third sending module 1002.

The third acquiring module 1001 is configured to acquire an audio file acquisition request reported by an audio playing device, the audio file acquisition request comprising a target definition and an identifier of a target audio file containing target audio content.

The third sending module 1002 is configured to send an audio playing instruction to the audio playing device, the audio playing instruction comprising the target audio file corresponding to the identifier and the target definition.

In detail, the audio playing apparatus provided in this embodiment may be configured in a server provided in an embodiment of the present disclosure and is configured to execute the audio playing method performed at the side of the server.

In a possible implementation of the embodiment of the present disclosure, the audio playing instruction further includes a fourth acquiring module, a first judging module, and a fourth sending module.

The fourth acquiring module is configured to acquire a loading speed change event reported by the audio playing device.

The first judging module is configured to determine whether a number of occurrences of the loading speed change event reported by the audio playing device within a second time period threshold exceeds a first number threshold.

The fourth sending module is configured to, when the number of occurrences of the loading speed change event reported by the audio playing device within the second time period threshold exceeds the first number threshold, send a voice inquiry message playing instruction to the audio playing device, the voice inquiry message playing instruction being configured to instruct the audio playing device to play a voice inquiry message to the user, the voice inquiry message being configured to inquire of the user whether to switch a definition for playing the target audio content.

In a possible implementation of the embodiment of the present disclosure, the audio playing instruction further includes a third determining module.

The third determining module is configured to, send the audio playing instruction to the audio playing device when it is determined that a time period elapsed since the voice inquiry message playing instruction is sent to the audio playing device is greater than a third time period threshold and the audio file acquisition request reported by the audio playing device is not acquired, or it is determined that a number of occurrences of sending the voice inquiry message playing instruction to the audio playing device is greater than a second number threshold and the audio file acquisition request reported by the audio playing device is not acquired.

In a possible implementation of the embodiment of the present disclosure, the audio playing instruction further includes a fourth determining module.

The fourth determining module is configured to determine a target definition achievable currently by the audio playing device based on the loading speed change event reported by the audio playing device.

In a possible implementation of the embodiment of the present disclosure, the audio playing instruction further includes a fifth determining module and a sixth determining module.

The fifth determining module is configured to determine a playing progress of a present audio file played by the audio playing device, the present audio file containing the target audio content.

The sixth determining module is configured to determine a starting playing moment of the target audio file based on the playing progress.

In a possible implementation of the embodiment of the present disclosure, the above-mentioned third sending module 1002 is configured to: send the audio playing instruction comprising the starting playing moment to the audio playing device.

It should be noted that, the foregoing description of the embodiment of the audio playing method performed at the side of the server also be applicable to the audio playing apparatus in this embodiment, which is not described herein again.

With the audio playing apparatus according to the embodiments of the present disclosure, when the audio file acquisition request reported by the audio playing device is acquired, the audio playing instruction may be sent to the audio playing device. Therefore, it may realize the self-adaptive control on the definition for playing the target audio content based on the present network condition of the audio playing device and the preset strategy, thereby improving the use effect of the audio playing device and the user experience.

To realize the above objectives, embodiments of another aspect of the present disclosure provide an audio playing device. The device may include a memory, a processor and computer programs stored on the memory and executable by the processor. The processor is configured to execute the computer programs to implement the audio playing method according to the embodiments of the first aspect of the present disclosure.

To realize the above objectives, embodiments of still another aspect of the present disclosure provide a server. The server may include a memory, a processor and computer programs stored on the memory and executable by the processor. The processor is configured to execute the computer programs to implement the audio playing method according to the embodiments of the second aspect of the present disclosure.

To realize the above objectives, embodiments of still another aspect of the present disclosure provide a computer-readable storage medium having computer programs stored thereon. When the computer programs are executed by a processor, the processor is caused to perform the audio playing method according to the embodiments of the first aspect of the present disclosure.

To realize the above objectives, embodiments of still another aspect of the present disclosure provide another computer-readable storage medium having computer programs stored thereon. When the computer programs are executed by a processor, the processor is caused to perform the audio playing method according to the embodiments of the second aspect of the present disclosure.

To achieve the above objectives, embodiments of still another aspect of the present disclosure provide a computer program product having stored computer programs thereon. When the computer programs are executed by a processor the audio playing method according to the embodiments of the first aspect of the present disclosure is performed.

To achieve the above objectives, embodiments of still another aspect of the present disclosure provide a computer program product having stored computer programs thereon. When the computer programs are executed by a processor the audio playing method according to the embodiments of the second aspect of the present disclosure is performed.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

In addition, terms such as "first" and "second" are used herein for purposes of description and are not intended to indicate or imply relative importance or significance. Thus, the feature defined with "first" and "second" may comprise one or more this feature. In the description of the present disclosure, "a plurality of" means two or more, for example, two, three, unless specified otherwise.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc. Although explanatory embodiments have been shown and described, it would be appreciated by those skilled in the art that the above embodiments cannot be construed to limit the present disclosure, and changes, alternatives, and modifications can be made in the embodiments without departing from scope of the present disclosure.

What is claimed is:

1. An audio playing method, performed in an audio playing device and comprising:

when a loading speed of a present audio file containing target audio content is changed during the present audio file is played, determining a target definition for playing the target audio content;

reporting an audio file acquisition request to a server, the audio file acquisition request comprising the target definition and an identifier of a target audio file containing the target audio content;

acquiring an audio playing instruction sent by the server based on the audio file acquisition request, the audio playing instruction comprising the target audio file corresponding to the identifier and the target definition; and playing the target audio file;

acquiring a voice inquiry message playing instruction sent by the server, the voice inquiry message playing instruction being configured to instruct the audio playing device to play a voice inquiry message to a user;

playing the voice inquiry message to the user, the voice inquiry message being configured to inquire of the user whether to switch a definition for playing the target audio content;

wherein, reporting the audio file acquisition request to the server, comprises: reporting the audio file acquisition request to the server, when a number of changes of the loading speed within a second time period threshold exceeds a first number threshold.

2. The method according to claim 1, wherein, reporting the audio file acquisition request to the server, comprises:

reporting the audio file acquisition request to the server when a confirmation instruction returned by the user in response to the voice inquiry message is received.

3. The method according to claim 1, wherein, reporting the audio file acquisition request to the server, comprises:

when a time period elapsed since the voice inquiry message is played to the user is greater than a third time period threshold and a confirmation instruction returned by the user in response to the voice inquiry message is not acquired, reporting the audio file acquisition request to the server;

or when a number of occurrences of playing the voice inquiry message to the user is greater than a second number threshold and a confirmation instruction returned by the user in response to the voice inquiry message is not acquired, reporting the audio file acquisition request to the server.

4. The method according to claim 1, wherein, before reporting the audio file acquisition request to the server, the method further comprises:

reporting a loading speed change event to the server at a preset time interval.

5. The method according to claim 1, wherein, the audio playing instruction further comprises a starting playing moment;

playing the target audio file comprises:

playing the target audio file based on the starting playing moment.

6. An audio playing device, comprising:

a memory;

a processor; and computer programs stored on the memory and executable by the processor, wherein the processor is configured to execute the computer programs to implement acts of:

when a loading speed of a present audio file containing target audio content is changed during the present audio file is played, determining a target definition for playing the target audio content;

reporting an audio file acquisition request to a server, the audio file acquisition request comprising the target definition and an identifier of a target audio file containing the target audio content;

acquiring an audio playing instruction sent by the server based on the audio file acquisition request, the audio playing instruction comprising the target audio file corresponding to the identifier and the target definition; and playing the target audio file;

acquiring a voice inquiry message playing instruction sent by the server, the voice inquiry message playing instruction being configured to instruct the audio playing device to play a voice inquiry message to a user;

playing the voice inquiry message to the user, the voice inquiry message being configured to inquire of the user whether to switch a definition for playing the target audio content;

wherein, reporting the audio file acquisition request to the server, comprises: reporting the audio file acquisition request to the server, when a number of changes of the loading speed within a second time period threshold exceeds a first number threshold.

7. The audio playing device according to claim 6, wherein the processor is configured to report the audio file acquisition request to the server by acts of:

reporting the audio file acquisition request to the server when a confirmation instruction returned by the user in response to the voice inquiry message is received.

8. The audio playing device according to claim 6, wherein the processor is configured to report the audio file acquisition request to the server by acts of:

when a time period elapsed since the voice inquiry message is played to the user is greater than a third time period threshold and a confirmation instruction returned by the user in response to the voice inquiry message is not acquired, reporting the audio file acquisition request to the server;

or when a number of occurrences of playing the voice inquiry message to the user is greater than a second number threshold and a confirmation instruction returned by the user in response to the voice inquiry message is not acquired, reporting the audio file acquisition request to the server.

9. The audio playing device according to claim 6, wherein the processor is further configured to implements acts of:

reporting a loading speed change event to the server at a preset time interval.

10. The audio playing device according to claim 6, wherein, the audio playing instruction further comprises a starting playing moment;

playing the target audio file comprises:

playing the target audio file based on the starting playing moment.

11. A non-transitory computer-readable storage medium having computer programs stored thereon, wherein when the computer programs are executed by a processor in an audio playing device, the processor is caused to perform an audio playing method, the method comprising:

when a loading speed of a present audio file containing target audio content is changed during the present audio file is played, determining a target definition for playing the target audio content;

reporting an audio file acquisition request to a server, the audio file acquisition request comprising the target definition and an identifier of a target audio file containing the target audio content;

acquiring an audio playing instruction sent by the server based on the audio file acquisition request, the audio playing instruction comprising the target audio file corresponding to the identifier and the target definition; and playing the target audio file;

acquiring a voice inquiry message playing instruction sent by the server, the voice inquiry message playing instruction being configured to instruct the audio playing device to play a voice inquiry message to a user;

playing the voice inquiry message to the user, the voice inquiry message being configured to inquire of the user whether to switch a definition for playing the target audio content;

wherein, reporting the audio file acquisition request to the server, comprises: reporting the audio file acquisition request to the server, when a number of changes of the loading speed within a second time period threshold exceeds a first number threshold.

12. The non-transitory computer-readable storage medium according to claim 11, wherein, reporting the audio file acquisition request to the server, comprises:

reporting the audio file acquisition request to the server when a confirmation instruction returned by the user in response to the voice inquiry message is received.

13. The non-transitory computer-readable storage medium according to claim 11, wherein, reporting the audio file acquisition request to the server, comprises:

when a time period elapsed since the voice inquiry message is played to the user is greater than a third time period threshold and a confirmation instruction returned by the user in response to the voice inquiry message is not acquired, reporting the audio file acquisition request to the server;

or when a number of occurrences of playing the voice inquiry message to the user is greater than a second number threshold and a confirmation instruction returned by the user in response to the voice inquiry message is not acquired, reporting the audio file acquisition request to the server.

14. The non-transitory computer-readable storage medium according to claim 11, wherein, before reporting the audio file acquisition request to the server, the method further comprises:

reporting a loading speed change event to the server at a preset time interval.

* * * * *